Oct. 24, 1939.                J. H. HAMMON                2,177,021
           FUSED MULTIFOCAL OPHTHALMIC LENS AND BLANK FOR MAKING THE SAME
                     Filed May 7, 1937           4 Sheets-Sheet 1

INVENTOR.
James H. Hammon.
BY
ATTORNEYS.

Oct. 24, 1939.    J. H. HAMMON    2,177,021
FUSED MULTIFOCAL OPHTHALMIC LENS AND BLANK FOR MAKING THE SAME
Filed May 7, 1937    4 Sheets-Sheet 2

INVENTOR.
James H. Hammon.
BY
ATTORNEYS.

Oct. 24, 1939.   J. H. HAMMON   2,177,021
FUSED MULTIFOCAL OPHTHALMIC LENS AND BLANK FOR MAKING THE SAME
Filed May 7, 1937   4 Sheets-Sheet 3

INVENTOR.
James H. Hammon.
BY
ATTORNEYS.

Oct. 24, 1939.  J. H. HAMMON  2,177,021
FUSED MULTIFOCAL OPHTHALMIC LENS AND BLANK FOR MAKING THE SAME
Filed May 7, 1937   4 Sheets-Sheet 4

INVENTOR.
James H. Hammon.
BY
ATTORNEYS.

Patented Oct. 24, 1939

2,177,021

UNITED STATES PATENT OFFICE 2,177,021

FUSED MULTIFOCAL OPHTHALMIC LENS AND BLANK FOR MAKING THE SAME

James E. Hammon, Vincennes, Ind.

Application May 7, 1937, Serial No. 141,308

8 Claims. (Cl. 88—54)

My invention relate to fused multifocal ophthalmic lenses and blanks for making the same. It has to do primarily with ophthalmic lenses having more than two fields of vision.

In the prior art, numerous efforts have been made to produce fused multifocal ophthalmic lenses having more than two fields of vision. Some of these efforts have met with successs. However, most of these efforts have been subject to certain drawbacks tending to interfere with the making and marketing of ophthalmic lenses of this type.

One prior art method which exemplifies the difficulties and drawbacks of many of these methods has consisted in the formation of a major blank of one index of refraction with a spherical pit ground therein, the fusing of a segment of a glass of a second index of refraction. In the said spherical pit, the grinding away of a portion of the segment and the surrounding glass to produce a second spherical pit and the fusing in said pit of a second segment in overlying or partly overlying relation to the first placed segment, followed by the final grinding of the surface in which the said segments are embedded. The successively ground pits so produced being of different radii of curvature and lying in different planes have, together with the different indices of refraction and the anterior surface of the lens, resulted in a lens blank from which could be produced a lens having three different fields of vision.

This prior art method, however, has possessed certain serious drawbacks. For one thing, the successive fusing operations upon the major blank have a tendency to produce distortion of the major blank and the segments. Likewise, the successive grinding of pits has not only increased the cost of manufacture but greatly increases the hazards in producing the finished blank, due to the tendency to destroy the segment first applied and the difficulty of forming the second pit in proper relation to the first pit. Numerous other objections exist, such as the practical impossibility of selectively locating the optical centers of the segments and the inability to produce prism segments with their bases selectively located, as well as chromatic aberrations and other drawbacks.

Another prior art method which illustrates a certain type of effort towards the solution of this problem has involved the formation of a major blank with a spherical countersink therein and a composite segment embodying two pieces of glass whose indices of refraction differ from each other and from that of the major blank, this composite segment being formed of substantially rectangular strips with their longitudinal edges fused together in edge-to-edge or straight line fusing. Under this method, the parts of the segment are loosely mounted in and substantially fill the spherical countersink and are then fused therein, after which the surface containing these embedded parts is ground to selected curvature.

Little or no success has been had with this last-described method. One reason has been that the different portions of glass forming the composite segment differ as to melting points. This creates great difficulty in properly joining the portions of the segment together due to their behavior under heat as well as difficulty in properly fusing them to the major blank. Numerous other difficulties exist and, at the present time, to my knowledge, no lens of this type has ever been marketed.

One of the objects of this invention is to provide a fused multifocal ophthalmic lens and a blank for the making of the same which is of such a form that it is possible to obtain three or more fields of vision whose ranges of powers are greatly increased both independently and with relation to each other.

Another object of this invention is to provide such a fused multifocal ophthalmic lens and a blank for the making thereof which is of such form that three or more fields of vision are obtainable while, at the same time, the ranges of power of each field of vision are widely variable with a given blank and without alteration of the indices of refraction of the portions of the blank.

Another object of this invention is to provide such a fused multifocal ophthalmic lens and a blank for making the same wherein the segments of glass embedded in the main blank may be rendered prismatic in form with the bases of these prisms subject to location in any desired direction.

Another object of this invention is to provide a fused multifocal ophthalmic lens and a blank for making the same which will permit of the production of either a trifocal lens or a lens having more than three fields of vision and with a wide range of powers of the several fields while, at the same time, these results are attainable with a greatly reduced number of lens blanks.

Various other objects and advantages of my invention will appear as this description progresses.

In the preferred form of my invention, I utilize a major blank having a spherical pit which preferably covers one surface of the blank. In conjunction with this major blank, I use a composite segment which preferably comprises two pieces of glass having indices of refraction which differ from each other and from the index of refraction of the major blank, these two pieces of glass being provided with abutting optical surfaces which are fused together and which are either plane surfaces or curved spherically to any predetermined radius of curvature. This composite segment is preferably embedded in a carrier button which may either be of the same index of refraction as the major blank or which may be of an index of refraction different from the major blank and also from the two pieces of glass which constitute the said composite segment or which may be of the same index of refraction as one of the pieces of glass constituting the said composite segment.

Numerous variations are possible but under one simple method of making a trifocal the composite segment is embedded in a carrier button which is of the same index of refraction as the major blank and which forms a wall extending entirely or partially around the said composite segment, while one side of the composite segment is exposed. The composite button thus formed is then ground away on the surface containing the exposed composite segment to eliminate a portion of one of the layers forming the composite segment while leaving an uncovered portion of the other layer. The surface so ground is then fused against the surface of the spherical pit of the major blank. Then, the opposite side of the composite button and a portion of the major blank are ground away to produce the anterior surface of a lens, which anterior surface will have embedded therein a composite segment containing substantially the full area of one of the layers of said composite segment overlying approximately half of the area of the other layer of the composite segment. Then, the opposite side of the blank is ground away to form the finished lens. This will result in a lens having a distance vision portion formed of the glass of the major lens blank and the carrier button, a reading vision portion of glass formed of the glass of the major blank plus the glass of one of the layers of the composite segment with the optical surface therebetween and an intermediate vision portion formed of the glass of the major blank, the glass of the layer of the composite segment which has been partially ground away and the overlying layer of the glass of the other layer of said composite segment, with these layers separated by an optical surface.

In another simple method of making a multifocal lens having four fields of vision, the same type of major lens blank with its spherical pit is utilized and the same composite segment having two layers whose indices of refraction differ from each other and from the major blank is also utilized. However, instead of mounting the said composite segment in a carrier button of the same index of refraction as the major lens blank, this composite segment is mounted in a carrier button which is of the same index of refraction as one of the layers of the composite segment. The composite button thus formed is then ground away upon the surface thereof which carries the exposed composite segment upon such a curvature that a part of one layer is entirely removed so as to expose a surface of the other layer. This composite button thus ground away is fused in the spherical pit of the major blank. The opposite surface of the said composite button and a portion of the major blank is then ground away to produce the anterior surface of the lens and to leave embedded in this surface a portion of the composite segment wherein each layer overlaps the other while an additional portion of each layer is not overlapped by the other. The posterior surface of the lens is then ground so as to leave a lens having four fields of vision. These fields of vision comprise a distance field which is composed entirely of the glass of the major blank, an intermediate distance field which is composed of a portion of one of the layers of the composite segment plus a portion of the glass of the major blank, a second intermediate distance field which is composed of the overlapping portions of the composite segment with an optical surface therebetween plus a portion of the glass of the major blank and a reading field or near vision portion which is composed entirely of the glass of one of the layers of the composite segment plus the glass of the major blank.

Various forms of my invention are illustrated in the accompanying drawings which contain illustrations which are somewhat magnified and wherein similar characters of reference designate corresponding parts and wherein.

Figure 1:
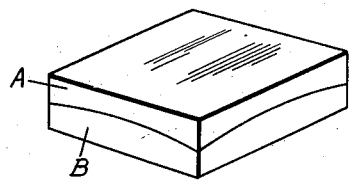
Figure 1 is a perspective view of a composite segment blank.
Figure 2:
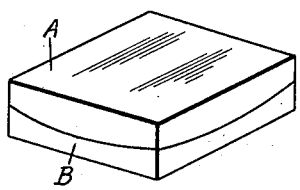
Figure 2 is a perspective view of a modified form of composite segment blank.
Figure 3:
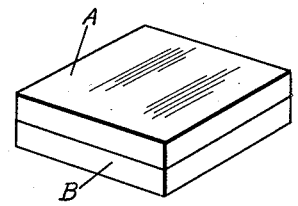
Figure 3 is a perspective view of another composite segment blank.

In the drawings, and referring more particularly to Figures 1 to 14, inclusive, which have to do primarily with the formation of a trifocal lens, it will be seen that I have provided a composite segment blank which is illustrated best in Figures 1, 2 and 3. In these figures, this composite segment blank is shown as being comprised of two layers of glass A and B.

In this form of my invention, the layer of glass A is of an index of refraction which is higher than the index of refraction of the major blank to be subsequently described. Likewise, the layer of glass B is of an index of refraction which is higher than the index of refraction of the layer of glass A. The abutting surfaces of these layers of glass A and B are optically finished and fused together to form the composite segment blank. The under surface of the layer A may be concave and the upper surface of the layer B convex, as shown in Figure 1. However, the under surface of the layer A may be convex and the upper surface of the layer B concave, as shown in Figure 2. However, these abutting surfaces of the layers A and B may be plane surfaces, as shown in Figure 3, if desired. The optical surfaces which are provided on the abutting surfaces of the layers A and B are predetermined in accordance with the demands of any given prescription. In other words, they have a definite and predetermined function in cooperation with other optical surfaces of the lenses in which they are to be embodied.

Figure 4:
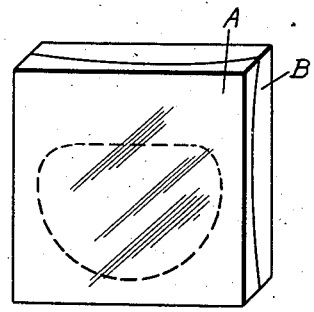
Figure 4 is a perspective view of the composite segment blank of Figure 1 with a dotted line illustration of the composite segment to be cut therefrom.
Figure 5:
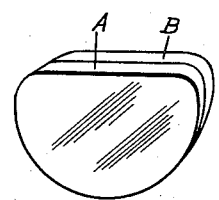
Figure 5 is a perspective view of my composite segment which has been cut from the blank shown in Figure 4.
Figure 6:
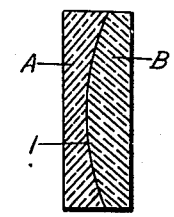
Figure 6 is a vertical transverse section, somewhat enlarged, of the composite segment shown in Figure 5.
Figure 7:
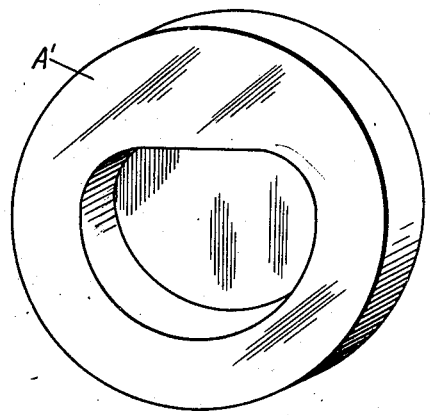
Figure 7 is a perspective view of a carrier button having a hole or socket embedded therein for the reception of the composite segment shown in Figure 6.
Figure 8:
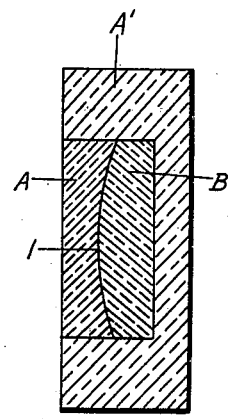
Figure 8 is vertical transverse section of the complete button formed by mounting the composite segment of Figure 6 in the carrier button of Figure 7.

After the layers A and B are fused together, as shown in Figures 1 and 4, a segment is cut therefrom along the dotted line of Figure 4 and this segment is illustrated in Figures 5 and 6. This segment is designed for mounting in a hole or socket provided in a carrier button $A^1$ which is shown in Figure 7. Preferably the hole or socket does not extend entirely through the carrier button $A^1$ and the composite segment of Figures 5 and 6 is fused in such hole or socket so that one surface of this composite segment is exposed as shown in Figure 8, which illustrates the composite carrier button which is to be ground and mounted with the major blank in a manner to be now described.

Figure 9:
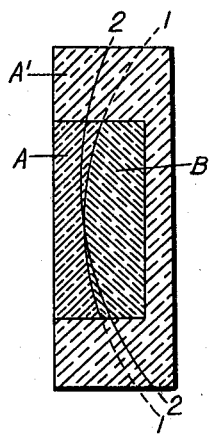
Figure 9 is a vertical transverse section similar to that shown in Figure 8 with a full line illustrating the portion of the composite button which is to be cut away and a dotted line illustrating the curvature between the layers of the composite segment.

In Figure 9, I have illustrated this composite carrier button and have applied thereto the dotted line 1—1 which shows the location of the optical surface between the layers of the composite segment prior to the grinding operation. The grinding operation is performed upon that side of the composite button which carries the exposed composite segment and the line 2—2 illustrates one manner of grinding this composite button. This grinding operation produces a composite button of the form shown in Figure 10, wherein the surface 2 corresponds to the line 2—2 of Figure 9.

Examination of Figure 10 will disclose that, after this grinding operation, the composite button is comprised of the carrier button $A^1$ which is of the same index of refraction as the major blank to be subsequently described. It also comprises a portion of the layer B which, however, has retained its full area, and a portion of the layer A which, however, is of considerably less than its original full area and has been so ground away as to leave a substantial portion of the layer B exposed and optically surfaced. It will be understood that the extent and inclination of the optical surface thus described may be varied, as desired, to vary the relative areas of the remaining portions of layers A and B.

Figure 10:
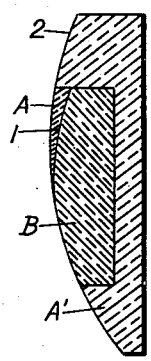
Figure 10 is a vertical transverse section of the composite button produced from the blank of Figure 9.
Figure 11:
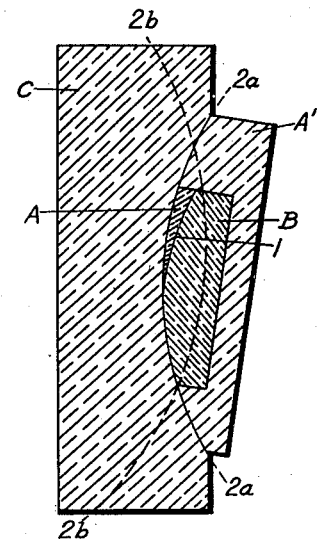
Figure 11 is a vertical transverse section of the rough blank, showing the composite button fused in the spherical pit of the major blank.

In Figure 11, I have shown a rough blank which has been produced by fusing the composite button of Figure 10 in a spherical countersink indicated by line 2a—2a of a major blank C which is formed of glass of the same index of refraction as the carrier button $A^1$. It should be understood, however, that it is within the scope of my invention to make the surface 2 of the composite button of Figure 10 of plane form and to provide on the major blank C a plane optical surface to which the plane surface of the composite carrier button is to be applied.

The rough blank thus formed may then be ground away on the side thereof which carries the composite button to form the anterior surface of a semifinished lens blank, the grinding operation extending to the line 2b—2b. This results in the production of the semifinished lens blank shown in Figure 12, wherein the anterior surface thereof is indicated at 2b. Then, the opposite side of the semifinished blank may be ground away to form a prescribed optical surface. The extent to which this grinding operation progresses is illustrated by the dotted line 3—3 in Figure 12 and the finished optical surface on the posterior side of the lens thus formed is designated 3 in Figure 13, which shows the finished lens in section. The lens thus formed is illustrated in front elevation in Figure 14.

Figure 13:
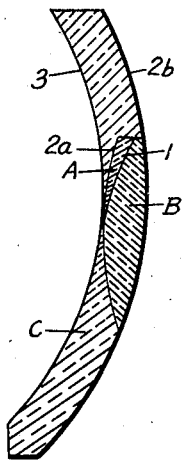
Figure 13 is a vertical transverse section of a finished lens formed from the semifinished blank of Figure 12 by grinding a curve illustrated by the dotted line of Figure 12.
Figure 14:
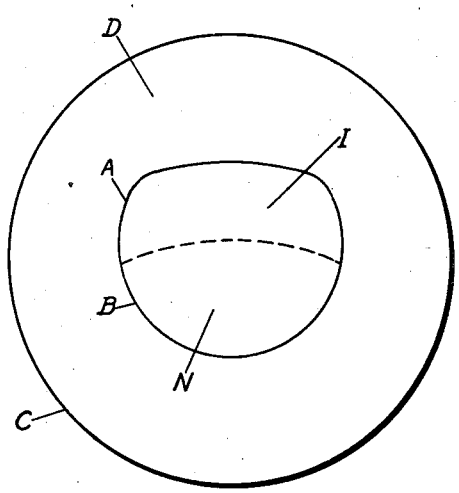
Figure 14 is a front plan view of the lens of Figure 13.

Considering Figures 13 and 14, it will be seen that the lens which has been formed by the above-described operations comprises a distance vision portion D, a near vision portion N and an intermediate vision portion I. The distance vision portion D contains a part of the glass of the major blank A and a part of the glass of the carrier button $A^1$, its refractory power being determined by the radii of curvature of the anterior surface $2b$ and the posterior surface 3. The near vision portion N is formed entirely by the lower portion of the segment B from which the segment A has been ground away plus the glass of the major blank A which is directly in back of the said portion of the segment B, the refractory power of this near vision portion being determined by the curved optical surfaces $2b$, $2a$ and 3. The intermediate vision portion I is formed by the upper portion of the segment B, plus the upper portion of the segment A which has remained after the grinding of the composite button, plus the glass of the major blank A which is directly behind the said portion of the segment B, the refractory power of this intermediate vision portion being determined by the optical surfaces $2b$, 1, $2a$ and 3.

It will be seen from the above that, by the use of a composite segment which is formed of the layers of glass of different indices of refraction A and B which are fused together with a previously selected optical surface therebetween and by the various steps described above in connection with Figures 4 to 12, inclusive, I have been able to produce a fused trifocal ophthalmic lens with a novel factor which will permit of the production of such lenses with much wider ranges of difference between the focal power of the various fields of the lens than have hitherto been possible. The additional optical surface which is formed between the fused layers of the composite segment may be varied widely and this factor may be utilized to vary the focal power of either the reading segment or the intermediate vision segment without varying the indices of refraction of the glass constituting the two layers of the composite segment. In other words, the manufacturer of lenses will no longer be forced to select glasses of closely prescribed indices of refraction for the attainment of near vision and intermediate vision segments of desired focal powers. This is particularly important in view of the fact that the effect of the fusing heat in the making of fused trifocals is such as to impose extremely severe limitations upon the glasses which may be used to produce fused trifocals or other multifocal ophthalmic lenses.

For illustration, where a fused trifocal is produced by using one-piece segments of indices of refraction which differ from each other and from the index of refraction of the major blank, the glass used for the intermediate vision segment must be of an index of refraction having a definite and substantially unchanging relation to the index of refraction of the glass used for the near vision segment, and vice versa. In many cases, only one type of glass can be used and a specially made glass is frequently necessary. This imposes a severe limitation on the range of focal powers obtainable.

However, with my invention, this limiting factor is relatively unimportant. The optical surface between the layers forming the composite segment may be widely varied as to focal power and this factor may be utilized to greatly increase the possible range of variation of focal powers of either the near vision segment or the intermediate vision segment or both. Moreover, this same additional factor and these consequent advantages thereof may be utilized in multifocal ophthalmic lenses having more than three fields of vision, as will be shown in the subsequent description of a modified form of my invention wherein a fused multifocal ophthalmic lens having more than three fields of vision and a method of forming the same will be described.

Another important advantage of my invention arises from the fact that my composite segment is mounted in a socket, hole or peripheral notch in a carrier button which may be of any peripheral contour and which provides in the composite button thus formed a wall of glass entirely or partially around the composite segment. Thus, as illustrated in Figure 7, the hole or socket formed in the carrier button is only partially circular and permits of the provision of a substantially flat upper edge. Reference to Figure 14 will show that this substantially flat upper edge of the socket of the carrier button results in an intermediate vision segment with a substantially flat upper edge in the finished lens. Obviously, the contour of the hole or socket in the carrier button may be altered as desired with a consequent alteration in the shapes of the near vision and intermediate vision field.

A further advantage arising from the mounting of my composite segment in a hole, socket or notch in a carrier button formed of glass of the same index of refraction as that of the major blank is that the fusing of the composite button against the optical surface of the major blank results in a composite segment which is embedded in the major blank with a surrounding wall of glass. This renders possible the grinding of the surface of the blank that carries the embedded segment at such an angle that the composite segment layer may be rendered prismatic in form with the optical centers thereof located at any desired point, either within or outside of the areas of these segments. Similar results can be obtained by disposing the composite button at variable points with relation to the deepest point of a spherical countersink or any portion thereof.

A further advantage of the method above described is that the area of the intermediate vision segment with relation to that of the near vision segment may be varied as desired. Thus, the grinding operation illustrated in Figures 9 and 10 may terminate short of the line 2—2 or may proceed beyond such line, either of which variations will result in varying the relative areas of the near vision field and the intermediate vision field. Obviously, also, the angle of inclination of the axis of the grinding tool may be varied as desired to effect further variations.

Figure 12:
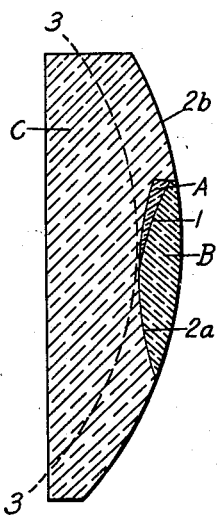
Figure 12 is a vertical transverse section of the blank produced by grinding away to the curved surface illustrated by the dotted line of Figure 11 to produce the front surface of a semifinished blank.

In Figures 12 and 13, the anterior surface $2b$ is shown ground to such an extent that the upper edge of this layer is provided with a shoulder. However, the grinding operation may be carried further to decrease or eliminate the thickness of this shoulder. Likewise, the grinding operation may be carried further or the grinding tool manipulated at a different angle to decrease the size of the periphery of the lower part of the segment B.

A modified form of my invention is illustrated in Figures 15 to 26, inclusive. By this modification, I am able to produce a fused multifocal ophthalmic lens with more focal areas than there are pieces of glass of different indices of refraction in the make-up of the lens. More specifically, in this modified form, I am able by the use of three different glasses of different indices of refraction to produce a fused multifocal ophthalmic lens having four fields of vision, that is, a distance vision field, an intermediate vision field, a second intermediate vision field and a near vision field. Moreover, I am able to produce these several fields and have them of such focal powers that distant objects may be viewed through the distance portion and that the vision may be transferred from the distance portion to the near vision portion through a series of intermediate fields which are so related that this transference may be effected with a minimum amount of consciousness and a minimum amount of disturbance. As a matter of fact, more fields of vision are possible, as will appear from the subsequent description. In addition, this modified form of lens and the method of making the same have other advantages which will be made clear as this description progresses.

Figure 15:
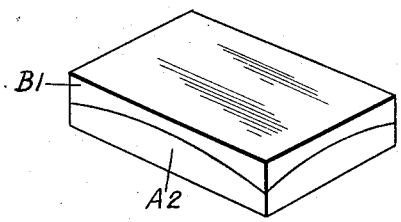
Figure 15 is a perspective view of a composite segment blank which is substantially identical with that shown in Figure 1 and which is to be used in producing a lens having either three or four fields of vision.

Referring to the drawings, it will be noted that Figure 15 shows a composite segment blank which is identical with that shown in Figure 2 except that the layer $B^1$ is shown on top instead of on the bottom of the segment blank. The layer $B^1$ is a glass of a selected index of refraction which is higher than the index of refraction of the major blank to which the composite button is to be applied. The under side of this layer $B^1$ is concave and is optically surfaced. The layer $A^2$ is formed of glass of an index of refraction which is higher than the index of refraction of the glass which constitutes layer $B^1$. The upper side of this layer $A^2$ is convexly curved to conform to the under side of the layer $B^1$ and is also optically surfaced. These layers $B^1$ and $A^2$ are fused together to form a composite segment blank.

Figure 16:
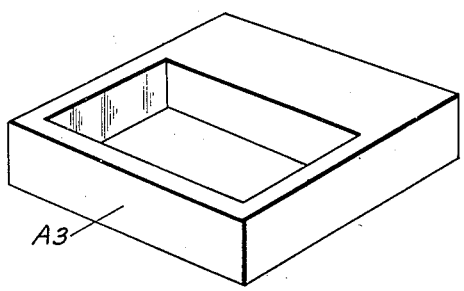
Figure 16 is a perspective view of a modified form of carrier button which is particularly suitable for use in the making of a lens having more than three fields of vision, although capable of use in the making of a lens having only three fields of vision.

In Figure 16, there is shown a carrier button which is provided with a rectangular hole or socket for the reception of the composite segment of Figure 15. This carrier button is formed of glass having the same index of refraction as the glass constituting the layer $A^2$ of the composite segment blank.

The composite segment blank of Figure 15 is positioned in the hole or socket of the carrier button of Figure 16 and fused therein. As the result of this fusing operation, the glass of the layer $A^2$ becomes homogeneous with the glass of the carrier button $A^3$, in the sense that the dividing lines or surfaces disappear. The result of this fusing operation is illustrated in Figure 17, in which the dotted lines illustrate the layer $A^2$ as it appears before the fusing operation while the layer $B^1$ is shown in full lines as having its optical surface $B^2$ deeply embedded in the composite button.

Figures 17, 18:
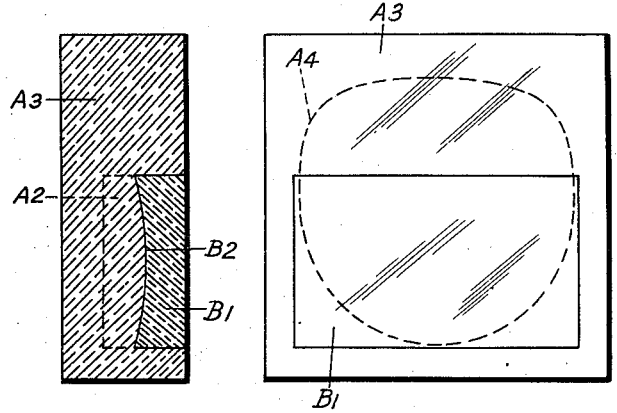
Figure 17 is a vertical transverse section of a composite blank showing the composite segment blank of Figure 15 embedded in the carrier button of Figure 16.
Figure 18 is a side elevation of the composite blank of Figure 17 with a line thereon showing the way in which the composite button is to be cut therefrom.
Figure 19:
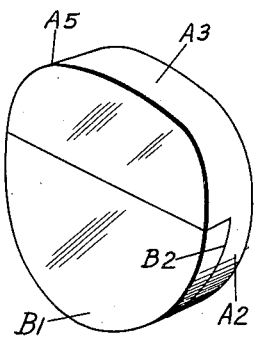
Figure 19 is a perspective view of the composite button after it is cut from the composite blank of Figure 18.
Figure 20:
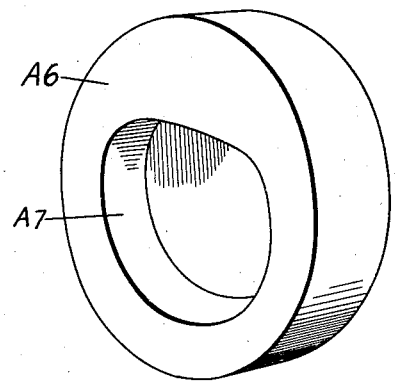
Figure 20 is a perspective view of a carrier button having a socket or hole therein for the reception of the composite button of Figure 19.

This composite button is shown in elevation in Figure 18 which also shows, by the dotted line $A^4$ the contour of the segment which is to be cut from this composite button. It should be noted that the segment which is cut from this composite button is of greater height and area than the composite segment so that the upper portion of it includes a substantial area of glass from the carrier button while the lower portion of it includes most of the glass from the composite segment. The resulting segment is shown in Figure 19 and may be designated $A^5$. To facilitate understanding, the various portions of this segment are designated $A^2$, $A^3$ and $B^1$ to illustrate their origin, although the portion $A^2$ and the portion $A^3$ have merged and become integral with each other. It will also be noted that this segment still contains the optically surfaced area $B^2$ in between the portions $B^1$ and $A^2$.

The segment $A^5$, shown in Figure 19, is designed to be mounted in a second carrier button $A^6$ of glass of the same index of refraction as one piece of the major blank having a hole or socket $A^7$ provided in one face thereof. The segment $A^5$ is mounted in this hole or socket $A^7$ and fused therein. This results in the formation of a composite button of the structure illustrated in Figure 21.

Figure 21:
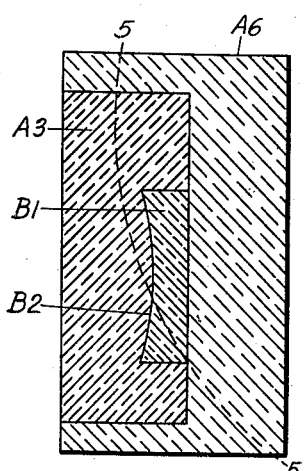
Figure 21 is a vertical transverse section of the button blank produced by embedding the segment of Figure 19 in the carrier button of Figure 20, with a dotted line showing one form of curve to be cut on that side of the blank containing the exposed composite segment.

This composite button illustrated in Figure 21 is then ground away upon that surface thereof in which the member $A^5$ is exposed, the grinding progressing until an optical surface indicated by the line 5—5 is formed. This optical surface is indicated at 5 in Figure 22. This composite button is then ready for mounting and fusing against an optical surface prepared upon a major blank.

Figure 22:
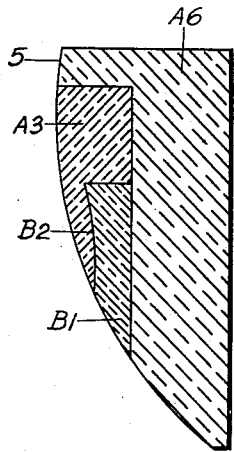
Figure 22 is a vertical transverse section of the blank of Figure 21 after it has been ground away for placing in the pit of the major blank.
Figure 23:
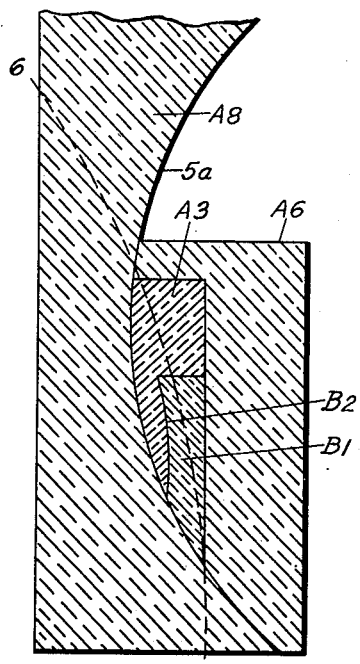
Figure 23 is a vertical transverse section of the rough blank after the blank of Figure 22 has been fused in the major blank.

In the mounting of this composite button of Figure 22, I preferably utilize a major blank $A^8$ of larger diameter than that shown in Figure 11 and one with a pit or spherical optical surface ground entirely across one side of the blank, as illustrated in Figure 23. This spherical optical surface or pit is designated $5a$ and the surface 5 of the composite button is fused thereagainst. This fusing operation results in the merging of the glass of the carrier button $A^6$ with the glass of the major blank $A^8$ and further results in the formation of the rough blank shown in Figure 23.

Figures 24, 25:
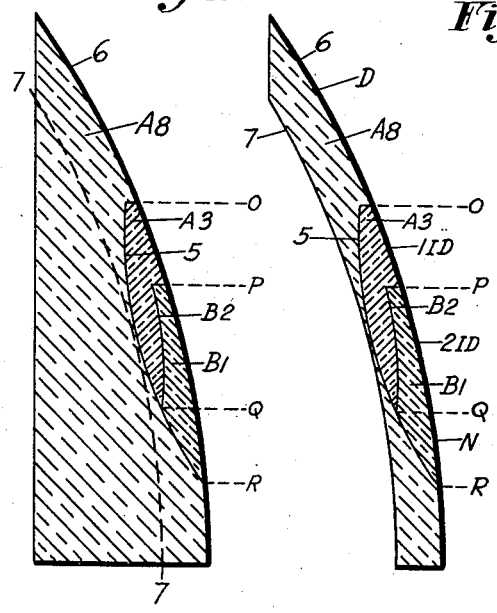
Figure 24 is a vertical transverse section of a semifinished blank formed by grinding away the rough blank of Figure 23 to produce the curve illustrated by the dotted line of Figure 23.
Figure 25 is a vertical transverse section of a finished lens formed from the semifinished blank of Figure 24 by grinding away to the dotted line shown on Figure 24.

The rough blank of Figure 23 is thereupon ground away to an optical surface indicated by the line 6—6 to form the anterior surface 6 of the semifinished blank, which is shown in Figure 24. This semifinished blank of Figure 24 is then ground away upon its opposite side to form an optical surface indicated by the line 7—7 of Figure 24, this optical surface being designated 7 in Figure 25.

Figure 26:
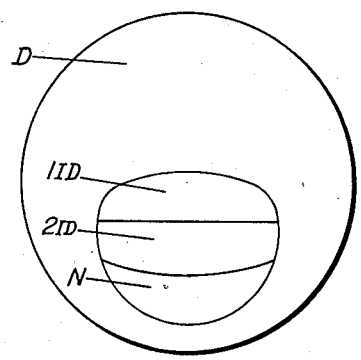
Figure 26 is a front elevation of the lens shown in Figure 25, illustrating the three fields of vision in addition to the distance field.

Figure 25 shows the finished lens in section and Figure 26 shows the same lens in front elevation. Examination of these figures will show that the lens comprises four fields of vision, namely, the distance vision field D, the first intermediate distance vision field 1ID, the second intermediate distance vision field 2ID and the near vision field N. The distance vision field D is formed entirely of glass of one index of refraction, being entirely composed of the glass of the major blank $A^8$. The first intermediate distance vision field 1ID is formed entirely of the glass of $A^3$ plus the glass of $A^8$ and its upper and lower limits are indicated by the letters O and P, on Figure 25, its refractory powers being determined by the optical surfaces 6, 5 and 7. The second intermediate distance vision field 2ID is formed entirely of the glass of $B^1$ which is taken from the layer $B^1$ of the composite segment of Figure 15, the glass of $A^3$ which is taken from the segment $A^2$ of the composite segment of Figure 15 and the glass $A^8$ of the major blank, the upper and lower limits of this second intermediate distance vision segment being indicated by P and Q on Figure 25 and the refractory powers of this second intermediate distance vision field being determined by the optical surfaces 6, $B^2$, 5 and 7. The near vision field N is formed entirely of the glass taken from the layer $B^1$ of the composite segment plus the glass $A^8$ of the major blank, the upper and lower limits of the near vision field being indicated by Q and R on Figure 25.

It will be seen from the above that, in the lens made in accordance with the method illustrated in Figures 15 to 26, inclusive, glasses of only three different indices of refraction are used. Nevertheless, the lens has four different local areas. This is made possible by the use of the composite segment formed of two layers of glass of different indices of refraction with an optical surface therebetween. The resulting lens has four different focal areas, one of which is produced entirely by glass of a single index of refraction, two of which focal areas are produced by laminations of glass of two different indices of refraction and one of which areas is produced by laminations of glass of three different indices of refraction.

It will also be apparent that this lens permits the viewing of a distant object through the distance portion and that, after the eye passes downwardly from the distance portion, it enters the first intermediate distance field of vision, passes downwardly through a second intermediate distance field of vision and passes therefrom downwardly into the near vision field. This permits of providing more than three fields of vision which may be so related that the eyes using it may pass into and out of successive fields of vision with minimum "jump of the image" and with greater freedom from disturbance than hitherto possible.

This lens and the method of making the same are such that the optical centers of the various component parts may be placed in exact relation with one another and made to coincide with the optical center of the distance vision field. On the other hand, if desired, the optical centers of the various component parts may be placed in any relative position to the distance vision field. Likewise, this lens and the method of making the same are such that the near vision field and the intermediate distance vision fields may be widely varied in shape and may be widely varied as to the relative portions of the lens or blank which they occupy. Likewise, the intermediate distance vision fields and the near vision fields may be varied in their relation to each other without changing the contour of the pit or depression in the major blank or without changing the contour of the front surface of the finished lens.

More specifically, to illustrate some of the possible variations in lenses built in accordance with this method, it will be seen that the contour of the optical surface may be of any desired prescription. If the other optical surfaces of the lens are presumed to remain constant, variation of the contour of this optical surface between the layers of the composite segment blank will result in alteration of the refractory powers of the segment intermediate distance vision field. This gives the lens an additional factor entering into the variation of the refractory powers which frees it from important limitations which characterize those types of lenses wherein the fields of vision are produced by the utilization of unitary segments, namely, rigid limitations imposed by the close restriction upon the nature of the glass segment because of the fusing difficulties attendant upon fusing glasses of different indices of refraction into a single blank. In other words, instead of being bound to certain ranges of refractive powers because of a necessity for having close and comparatively unchanging relationships between the indices of refraction of the different glasses used in a multifocal lens, as in the prior art, I am able to obtain much wider ranges of refractive powers by alteration of the optical surface between the layers of the composite segment.

Also, the mounting of the composite segment in a hole or socket of a carrier button which is of the same index of refraction as one of the layers of the said composite segment permits the formation of an intermediate distance vision field immediately above the near vision field, which intermediate distance vision field contains an embedded segment of prismatic form whose optical center can be located either within or outside of the segment and at any selected relation to the optical center of the distance vision field. Likewise, the mounting of the composite segment of Figure 19 in a carrier button formed of glass of the same index of refraction as the glass of the major blank and in a hole or socket therein so that the glass of this carrier button forms a wall of substantial depth surrounding the said composite segment of Figure 19 further permits of the formation of an intermediate distance vision field with a prismatic segment embodied therein and with the optical center of this prismatic segment disposed either within or outside of the segment and at any selected relation to the optical center of the distance vision portion.

It will be understood, however, from an inspection of Figure 25, that the optical surface 6 may be ground away to entirely eliminate any wall or shoulder at the juncture of the upper edge of the first intermediate distance vision field and the portion of the distance vision field thereabove. Likewise, this optical surface 6 may be ground to such an extent or with the grinding tool at such an angle as to vary the size of the near vision field.

In the making of a lens or lens blank in accordance with my invention, it is desirable that the layer of glass of the composite segment which has the lower index be disposed adjacent to the major blank which is normally of a still lower index, so that fusing difficulties may be minimized. However, it is within the bounds of my invention to place the glass of the composite segment which has the higher index adjacent to the major blank.

Having thus described my invention, what I claim is:

1. An unfinished blank for making a multifocal ophthalmic lens comprising a major blank of glass of one index of refraction having an optical surface of predetermined curvature formed thereon, a composite button disposed on said optical surface, said composite button comprising a carrier portion of glass of the same index of refraction as the major blank, said carrier portion having two segments of glass of indices of refraction different from each other and from the index of refraction of the glass of the major blank and the carrier portion disposed in a socket formed in said carrier portion, said segments having cooperating portions which overlap and abut each other, the overlapping surfaces of said segments being optical surfaces of predetermined curvature, the inner segment extending beyond the area of the outer segment and the extending portion thereof also extending outwardly beyond the inner surface of the outer segment, an embedded shoulder being formed along the boundary between said outer segment and the outwardly extending portion of the inner segment, an embedded shoulder being also formed along a portion of the boundary between said inner segment and said carrier portion, the inner surface of said composite button being finished to a curvature corresponding substantially to that of the curved optical surface formed on the major blank and in such a manner that the entire area of the inner surface of the inner segment but only a portion of the area of the corresponding surface of the outer segment will contact with the curved optical surface of said major blank.

2. An unfinished blank for making a multifocal lens comprising a major blank of glass of one index of refraction having an optical surface formed thereon, a composite button disposed on said optical surface, said composite button comprising a carrier portion of glass having two segments of glass, each of which is of an index of refraction different from said carrier portion, disposed in a socket formed therein and being substantially laterally surrounded by said carrier portion, said segments having portions which overlap and abut each other, the overlapping surfaces of said segments being optically finished surfaces, the inner segment extending beyond the area of the outer segment and the extending portion thereof also extending outwardly beyond the inner surface of the outer segment, an embedded shoulder being formed along the boundry between said outer segment and the outwardly extending portion of the inner segment, the inner surface of said composite button being finished to form an optical surface thereon and in such a manner that the entire area of the inner surface of the inner segment but only a portion of the area of the corresponding surface of the outer segment will contact with the curved optical surface of said major blank.

3. An unfinished blank for making a multifocal lens comprising a major blank of glass of one index of refraction having an optical surface formed thereon, a composite button disposed on said optical surface, said composite button comprising a carrier portion of glass having a plurality of segments of glass, each of which has an index of refraction different from the carrier portion, disposed in a socket formed therein, said segments being disposed in superimposed relationship and contacting each other, the contacting surfaces of said segments being optically finished surfaces, the inner surface of said composite button being finished to form an optical surface thereon and in such a manner that the entire area of the inner surface of the inner segment but only a portion of the area of the corresponding surface of the outer segment and at least a portion of the inner surface of the carrier portion will contact with the optical surface of said major blank.

4. A blank for making a multifocal ophthalmic lens comprising a major blank of glass of one index of refraction, said major blank having a countersink formed in one side thereof, a composite segment disposed in said countersink, said composite segment comprising two segments of glass of indices of refraction different from each other and from the index of refraction of the glass of the major blank, said segments having cooperating portions which overlap and abut each other and other portions which do not overlap each other, the abutting surfaces of said segments being optical surfaces of predetermined curvature, the inner segment of the composite segment having the portion thereof which does not overlap the outer segment extending outwardly beyond the inner surface of the outer segment, the inner surface of said composite segment being formed by the entire inner surface of said inner segment and only a portion of the inner surface of said outer segment, the outer surface of said composite segment being formed by the entire outer surface of said outer segment and only a portion of the corresponding surface of said inner segment, an embedded shoulder being formed along the boundary between said outer segment and the outwardly extending portion of said inner segment, and an embedded shoulder being formed along a portion of the boundary between said inner segment and the major blank.

5. A blank for making a multifocal ophthalmic lens comprising a major blank of glass of one index of refraction, said major blank having a pit formed in one side thereof, a composite segment disposed in said pit, said composite segment comprising two segments of glass of indices of refraction different from each other and from the index of refraction of the major blank, said segments having cooperating portions which overlap each other and other portions which do not overlap each other, the contacting surfaces of said segments being optically finished surfaces, the inner surface of said composite segment being formed by the entire inner surface of the inner segment and only a portion of the corresponding surface of the outer segment and having a continuous uninterrupted curvature, the outer surface of said composite segment being formed by the entire outer surface of the outer segment and only a portion of the corresponding surface of the inner segment, a buried shoulder being formed along the boundary line between said segments.

6. A blank for making a multifocal ophthalmic lens comprising a major blank of glass of one index of refraction, said major blank having a composite segment fused thereto, said composite segment comprising a plurality of segments of glass, of indices of refraction different from that of the major blank and from each other, said segments being disposed in superimposed partially overlapping relationship, the contacting surfaces of said segments being optically finished surfaces, the inner surfaces of said composite segment being continuous and being formed by the entire inner surface of the innermost segment and only a portion of the corresponding surface of the outermost segment, the outer surface of the composite segment being formed by the entire outer surface of the outermost segment and only a portion of the corresponding surface of the innermost segment, each of said segments having a shoulder at the same edge buried below the surface of the major blank.

7. An unfinished blank for making a multifocal ophthalmic lens comprising a major blank of glass of one index of refraction having an optical surface of predetermined curvature formed thereon, a composite button disposed on said optical surface, said composite button comprising a carrier portion of glass of the same index of refraction as that of the major blank and having a socket with walls of substantial depth formed in a selected location therewithin, two segments of glass of indices of refraction different from each other and from the index of refraction of the major blank and the carrier portion disposed in said socket in the carrier portion so that they will be substantially laterally surrounded by said carrier portion, said segments being disposed in superimposed relationship and contacting each other, the contacting surfaces of said segments being optical surfaces of predetermined curvature, each of said segments having a shoulder formed along the boundary thereof embedded in said carrier portion, the inner surface of said composite button being finished to a curvature corresponding substantially to that of the curved optical surface formed on the major blank and in such a manner that the entire area of the inner surface of the inner segment but only a portion of the area of the corresponding surface of the outer segment and at least a portion of the inner surface of the carrier portion will contact with the curved optical surface of said major blank.

8. An unfinished blank for making a multifocal ophthalmic lens comprising a major blank of glass having an optical surface formed thereon, a composite button disposed on said optical surface, said composite button comprising a carrier portion of glass having a socket formed therein, a plurality of segments of glass disposed in said socket in the carrier portion and being substantially surrounded by said carrier portion, said segments being in superimposed relationship and contacting each other, each of said segments being of an index of refraction different from the carrier portion and the contacting surfaces of said segments being optical surfaces, the inner face of said composite button being finished to form an optical surface thereon and in such a manner that the entire area of the inner surface of the inner segment but only a portion of the area of the corresponding surface of the outer segment and at least a portion of the inner surface of the carrier portion will contact with the optical surface of said major blank, at least one of said segments having a thick shoulder along its boundary buried in said carrier portion.

JAMES H. HAMMON.